United States Patent [19]
Ress

[11] 3,935,503
[45] Jan. 27, 1976

[54] PARTICLE ACCELERATOR

[75] Inventor: Thomas I. Ress, Buena Park, Calif.

[73] Assignee: The Kreidl Chemico Physical K.G., Schaan, Liechtenstein

[22] Filed: Nov. 26, 1973

[21] Appl. No.: 418,858

[52] U.S. Cl. ......... 315/111.6; 313/231.4; 313/362; 315/111.7; 331/94.5 C; 331/94.5 G; 331/DIG. 1; 328/233
[51] Int. Cl.² .......................................... H05H 1/12
[58] Field of Search ............. 313/63, 231, 359, 362, 313/231.4; 315/111, 111.4, 111.6, 111.7; 328/233; 331/94.5 C, 94.5 G, 94.5 V; 250/251, 290, 291, 293, 294, 298, 423, 424

[56] References Cited
UNITED STATES PATENTS

| | | | |
|---|---|---|---|
| 2,572,551 | 10/1951 | Wideroe | 328/233 X |
| 2,640,923 | 6/1953 | Pollock | 328/233 |
| 2,932,797 | 4/1960 | Symon | 328/233 |
| 3,113,427 | 12/1963 | Meyer | 328/233 X |
| 3,252,047 | 5/1966 | Fonda-Bonardi | 315/111.6 |
| 3,442,758 | 5/1969 | Penfold et al. | 315/111 X |
| 3,516,013 | 6/1970 | Pole | 331/94.5 C |
| 3,551,828 | 12/1970 | Stengel | 328/233 |
| 3,715,581 | 2/1973 | Matsuda | 250/290 |
| 3,778,612 | 12/1973 | Ashkin | 250/251 |
| 3,801,438 | 4/1974 | Ohkawa | 315/111 X |

*Primary Examiner*—Paul L. Gensler
*Attorney, Agent, or Firm*—Singer & Singer

[57] ABSTRACT

Charged particles are entrained in a predetermined direction, independent of their polarity, in a circular orbit by a magnetic field rotating at high speed about an axis in a closed cylindrical or toroidal vessel. The field may be generated by a cylindrical laser structure, whose beam is polygonally reflected from the walls of an excited cavity centered on the axis, or by high-frequency energization of a set of electromagnets perpendicular to the axis. In the latter case, a separate magnetostatic axial field limits the orbital radius of the particles. These rotating and stationary magnetic fields may be generated centrally or by individual magnets peripherally spaced along its circular orbit. Chemical or nuclear reactions can be induced by collisions between the orbiting particles and an injected reactant, or by diverting high-speed particles from one doughnut into the path of counterrotating particles in an adjoining doughnut.

12 Claims, 16 Drawing Figures

PARTICLE ACCELERATOR

FIELD OF THE INVENTION

My present invention relates to a particle accelerator in which electrons and/or ions are driven along a circular path to attain a certain speed, e.g. for the purpose of inducing chemical or nuclear reactions, and to a method of operating such an accelerator.

BACKGROUND OF THE INVENTION

In conventional systems of the Cyclotron type the particles are accelerated in a high-frequency electric field set up between hollow segmental electrodes, termed dees, the particles being constrained by a constant transverse magnetic field to spiral outwardly in a path centered on the field axis. The frequency of the electric driving field, acting intermittently upon the particles, must be correlated with their mass/charge ratio which therefore must be the same for all particles to be accelerated in synchronism. Moreover, the sense of acceleration and therefore the direction of rotation depends on the polarity of the particle.

If an attempt were made to accelerate a gaseous plasma in such systems, the polarity-dependent direction of motion of the particles and the diversity of their mass-charge ratios would cause turbulence and untimely collisions between particles traveling at different velocities; the resulting nonuniformity in the speeds of particle streams prevents the establishment of controlled conditions for the desired nuclear or chemical reactions.

In Tokomak-type or Betatron-type accelerators, particles of different polarities are driven in opposite directions by a magnetic field, perpendicular to their orbital plane, whose intensity increases monotonically during each propulsion cycle. When driving a plasma, most of the field energy is tranferred to the electrons, which causes power losses and excessive turbulence of the plasma flow.

Another conventional way of imparting high kinetic energies to molecular particles is by heating a gas to an elevated temperature, such as that produced by a plasma arc. This method of particle acceleration, however, is uneconomical since it produces a wide range of particle energies, not confined to the characteristic energy level of a desired reaction, in accordance with the Maxwell-Boltzmann law of energy distribution in a heated gas, with consequent reduction in the efficiency of the process. Moreover, the unwanted energy bands may also give rise to parasitic side reactions.

OBJECTS OF THE INVENTION

The general object of my present invention is to provide an effective accelerator for gases in the plasma state, i.e. a neutral mixture of ions and electrons. A related object is to provide an accelerator capable of transferring most of the drive-field energy to the ions of the plasma.

A more particular object is to provide an accelerator of this nature especially designed to generate plasma streams of very large flow rates and with ion energies adjustable between about 0.2 and 25 electron-volts for selectively stimulating specific chemical reactions, thereby producing pure end products including compounds not obtainable by thermal synthesis.

Another specific object of this invention is to provide an accelerator of this nature for driving dense plasma streams of hydrogen isotopes to kinetic energies of more than 10,000 electron-volts for inducing nuclear collisions as a source of neutrons and thermal power.

It is also an object of my invention to provide an efficient method of accelerating a plasma stream for the purposes set forth.

SUMMARY OF THE INVENTION

The basic principle underlying my present invention is the entrainment of charged particles (electrons and/or ions) about the axis of a closed vessel, of generally cylindrical or toroidal configuration, by a magnetic field whose vector is substantially perpendicular to that axis and revolves about same at a constant speed so chosen that the particles acquire the desired kinetic energy upon being accelerated to that speed. The magnetic vector may be regarded as the centerline of a zone of substantially homogeneous magnetic flux extending over at least the full axial height of the vessel, any point of that zone revolving about the vessel axis at a predetermined speed.

As is well known, a charged particle entering a homogeneous magnetic field with a velocity component perpendicular thereto is deflected into a circular or helical path whose sense of curvature depends on the polarity of the charge and whose radius varies inversely with field strength and charge while being directly proportional to particle mass and speed. Thus, a stationary particle overtaken by the revolving magnetic vector experiences a thrust transverse to the vector's surface of revolution, deflecting it onto an arc centered on the revolving vector. The axial magnetostatic field deflects the moving particle onto an orbital path encircling the vessel axis, with scalloped transverse excursions resembling a cycloid, at a mean speed corresponding to that of the magnetic-field zone surrounding the particle.

For low gas pressures, with few interactions between particles, the mean orbital speed — which is independent of the polarity of the charge of the particles — practically equals that of the rotating magnetic field whereas for higher gas pressures the average speed may be somewhat lower.

There are several ways in which, according to my present invention, such a revolving electromagnetic field can be set up. One such way is the energization of two or more angularly offset electromagnets at the same frequency but with a phase difference related to their angular spacing, similar to the stator field of a multiphase electric motor. A separate steady axial focusing field, independent of the high-frequency propulsion field, may be used in that case to restrain the particles from impinging upon the peripheral wall of the vessel. If that vessel is of toroidal configuration, a shape hereinafter referred to as a "doughnut" in conformity with conventional terminology, the sinusoidally excited electromagnets may be positioned remote from the vessel axis and spaced along the centerline of the toroid. In a similar manner, a multiplicity of axially oriented steady-flux (e.g. permanent) magnets may be disposed along that centerline to limit the orbital radius of the particles, these latter magnets being either interleaved or coplanar with the electromagnets. In order to limit the axial dispersion of the particles, the steady-flux magnets may be provided with pole shoes converging on the concave side of the centerline so as to give an inward slant to the substantially axially directed focusing field. If the particles are positive ions and electrons, the focusing field should be strong enough to keep the ions in orbit; their charge, in turn, will prevent the electrons from straying.

According to another feature of my invention, the revolving magnetic field is generated by a multiplicity of virtual magnet poles set up in a cylindrical laser structure in which a beam is reflected at the peripheral wall of the vessel along intersecting chords that are tangent to a circle concentric with this wall; the points of intersection define a polygon generally paralleling the annular path of the particles and constituting an invisible electric barrier which prevents their radial outward deflection to the peripheral wall, thereby dispensing with the need for a magnetostatic focusing field.

More specifically, as described in greater detail hereinafter, each side of the polygon is a minor fraction of the vessel diameter and is equal to the free-space wavelength of the laser frequency. The midpoint of each polygon side is traversed by a magnetic vector which extends in radial direction if the laser beam is appropriately polarized. With an n-sided polygon corresponding to n points of reflection ($n$ being an even number), a system generating standing waves is equivalent to one with $n$ electromagnets spaced along the orbital path of the particles.

If adjacent polygon sides (or electromagnets) are energized in phase opposition, the high-frequency field can be regarded as composed of two counterrotating vectors whose angular velocity is $2\omega/n$ ($\omega$ being the pulsatance of the excitation current); if the particles are injected with a definite initial velocity component in peripheral direction, they will be entrained only by the corotating vector. Moreover, since the electromagnetic field moves in the direction of beam propagation along each polygon side and this movement is codirectional throughout the polygon, there exists a favored sense of rotation even in this case. In the more general situation, in which the system is excited to set up a number of magnetic dipoles equaling an aliquot fraction of $n$, the number of such dipoles determines the speed of rotation of the field about the axis.

All embodiments of my present invention employ a rotating magnetic field for entraining charged particles within a vessel in the general direction of field rotation, regardless of their mass and polarity. Since all charged particles are accelerated to an average rotary velocity equal to the velocity of the rotating magnetic field, the average kinetic energy of each particle is directly proportional to its mass. For example, the protons of an atomic hydrogen plasma would be driven by the magnetic field to an average kinetic energy 1,836 times greater than the average electron energy. The capability of charged particle accelerators according to my present invention of transfering a large fraction of the magnetic field energy to the ions of an accelerated plasma stream greatly facilitates the control and containment of such streams by suitable magnetostatic focussing fields, and aids in stimulating chemical interactions among the colliding molecules of two chemical reactants.

BRIEF DESCRIPTION OF THE DRAWING

The above and other features of my present invention will now be described in detail with reference to the accompanying drawing in which.

SPECIFIC DESCRIPTION

Figure 1:
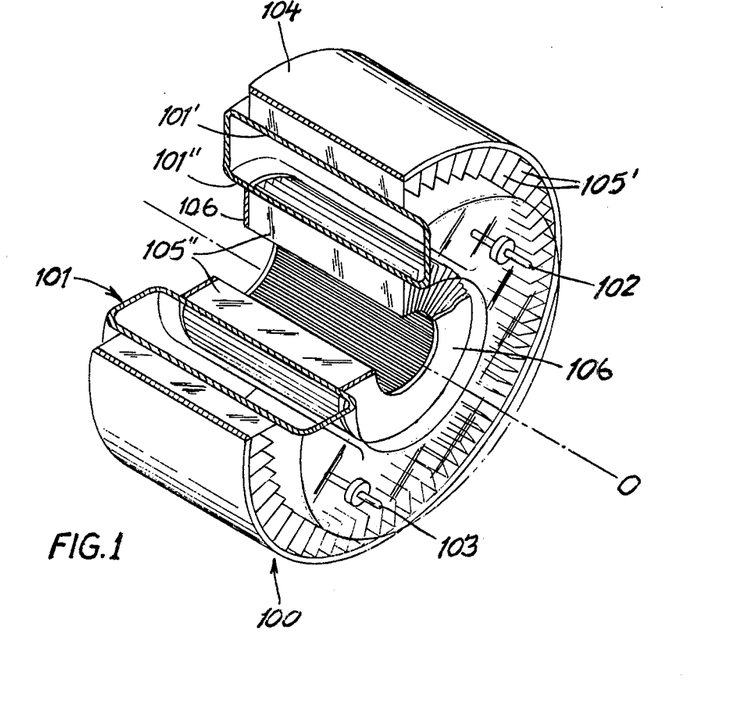
FIG. 1 is a perspective view (parts broken away) of a laser-type accelerator embodying my invention.
Figure 2:
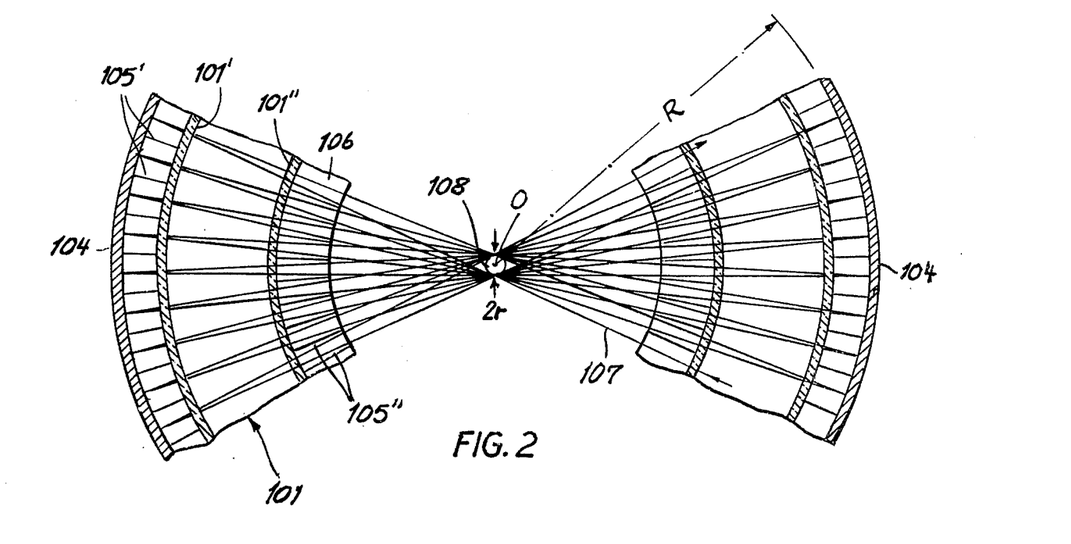
FIG. 2 is a fragmentary cross-sectional view of the accelerator shown in FIG. 1.

I shall first describe, with reference to FIGS. 1 - 5, a cylindrical laser structure designed as a particle accelerator in accordance with my present invention. This structure comprises a closed toroidal vessel 100 with an annular cavity 101 having an axis O. Cavity 101 is filled with a gas suitable for the stimulated emission of light quanta upon electric excitation, from a nonillustrated high-frequency oscillator, by means of input electrodes 102, 103 terminating in internal probes not shown. The radiation-transparent outer peripheral wall 101' of cavity 101 is coaxially surrounded by a cylindrical reflector 104, its inner peripheral wall 101" being also transparent to a laser beam generated inside the cavity. Outer baffles 105' between walls 104, 101' and inner baffles 105" next to the transparent wall 101" project radially toward the axis 0 and are peripherally equispaced, as best seen in FIG. 2. The baffles 105' are mounted on reflector 104 whereas the baffles 105" are carried on a pair of parallel flat rings 106.

FIG. 2 also shows a coherent laser beam 107 passing generally diametrically through the cavity 101 with multiple reflections along wall 104. Each pass of the beam 107 is tangent to a circle 108, centered on axis 0, whose radius $r$ is small compared with the radius R of the inner peripheral wall. Such a beam will form a multiple array of electromagnetic pole pairs, as explained above, if the transit time across the vessel is exactly equal to a whole number of cycles of the exciting oscillation and if its path forms a closed polygon so as to be iteratively retraced by the beam; the polygon, though regular, is folded back toward the center so that its sides form chords of the circular periphery of wall 104.

Figure 3:
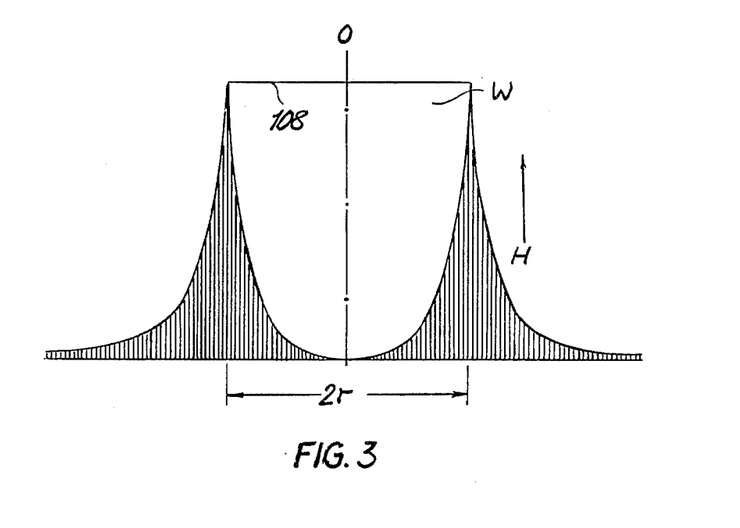
FIG. 3 is a diagram showing the axial field distribution in the accelerator of FIGS. 1 and 2.
Figure 4:
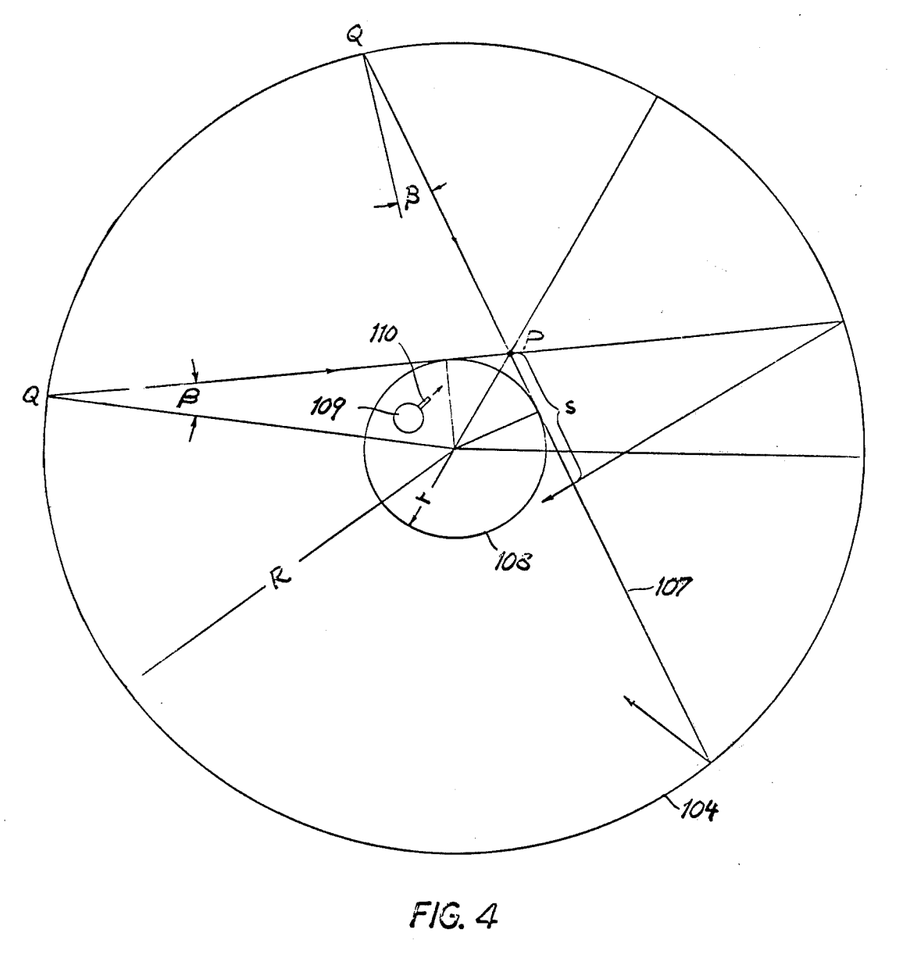
FIG. 4 is a diagrammatic representation of the structure of FIG. 2, showing details of the path of a coherent laser beam passing therethrough.

Parts of the beam path have been drawn more distinctly in FIG. 4 where the circle 108 has been relatively enlarged for the sake of clarity. Each pass of the beam is seen to include an angle $\beta = \sin^{-1} r/R$ with the radial direction R. At intersections P between two passes, the combined beam energy is a maximum if the wave fronts are in phase, i.e. if the phase difference of the exciting oscillation at reflection points Q compensates for the differences in path lengths Q/P. The several intersection points P, therefore, are the corners of a smaller polygon which surrounds and generally parallels the circle 108 and which almost merges with that circle for very small values of $\beta$, i.e. with $R >> r$. Thus, as shown in FIG. 3, the intensity H of the magnetic components of the generated electromagnetic field becomes a maximum in the vicinity of circle 108 which may therefore be considered the boundary of a well W wherein the generation of plasma may take place. The sides s of the polygon defined by points P are equal to the wavelength of the laser beam.

Figure 5:
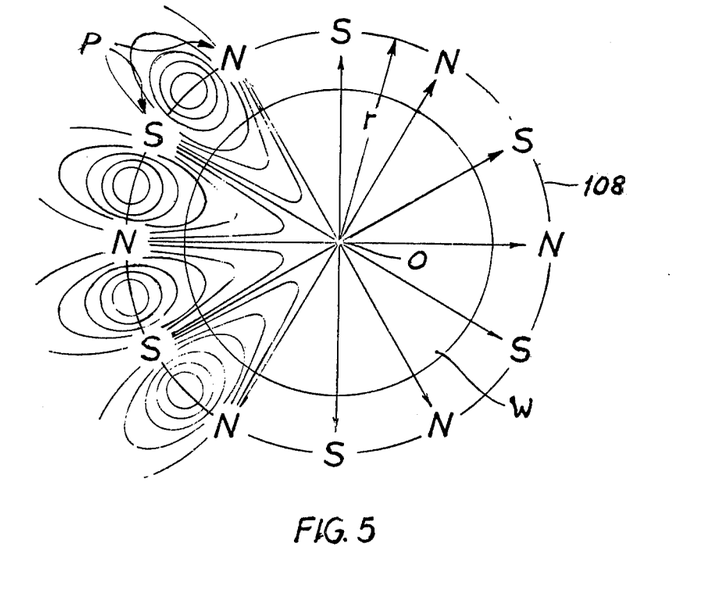
FIG. 5 is a diagram showing the distribution of the magnetic-field poles induced by the laser beam in a radial plane of the accelerator.

The instantaneous magnetic-field distribution in and around that well, in a plane transverse to the vessel axis, has been illustrated in FIG. 5 for the case in which the cavity resonates in a 6-pole mode, i.e. where the peripheral field goes to zero simultaneously at locations 30° apart. This corresponds to 6 N-S dipoles rotating around the well W, i.e. to six pairs of intersection points P where the magnetic field varies in phase opposition between a positive and a negative maximum. It will be understood that at intermediate locations along the circle there exist other intersection points, not illustrated in FIG. 5, where the radial magnetic field at the same time assumes leser amplitudes including zero amplitude at a midpoint or node. Thus, the points shown in FIG. 5 are the poles of a rotating magnetic field developed in an annular zone centered on axis O.

As a result of the aforestated field distribution and the intensity of the laser beam, any neutral gas molecule passing through the well W will be instantly ionized and the resulting positive ions and negative electrons will be accelerated into an annular rotating plasma stream which remains trapped within the well. This process continues until most of the gas molecules in the interior of the vessel 100 are ionized and circulating within the well. The gas may be injected into the vessel in a generally tangential direction, continuously or intermittently, with the aid of a tube 109 having one or more nozzles 110, as illustrated in FIG. 4, within the evacuated housing (not shown) which envelops the cavity 101.

If the baffles 105', 105'' were omitted, the laser beam 107 could develop other stable modes which would not form the polygonal array of poles P shown in FIG. 4.

The motion of the charged particles could also have an axial component letting the gas enter the vessel at one end and exit at the other end. A majority of them could then be tangentially discharged from the exit end of the well to impinge upon some other medium for chemical or nuclear interaction therewith, in the general manner described hereinafter with reference to FIGS. 13 – 16.

Reference will now be made to FIGS. 6 – 16 for the description of a plasma drive according to my invention employing stationary electromagnets.

Figure 6:
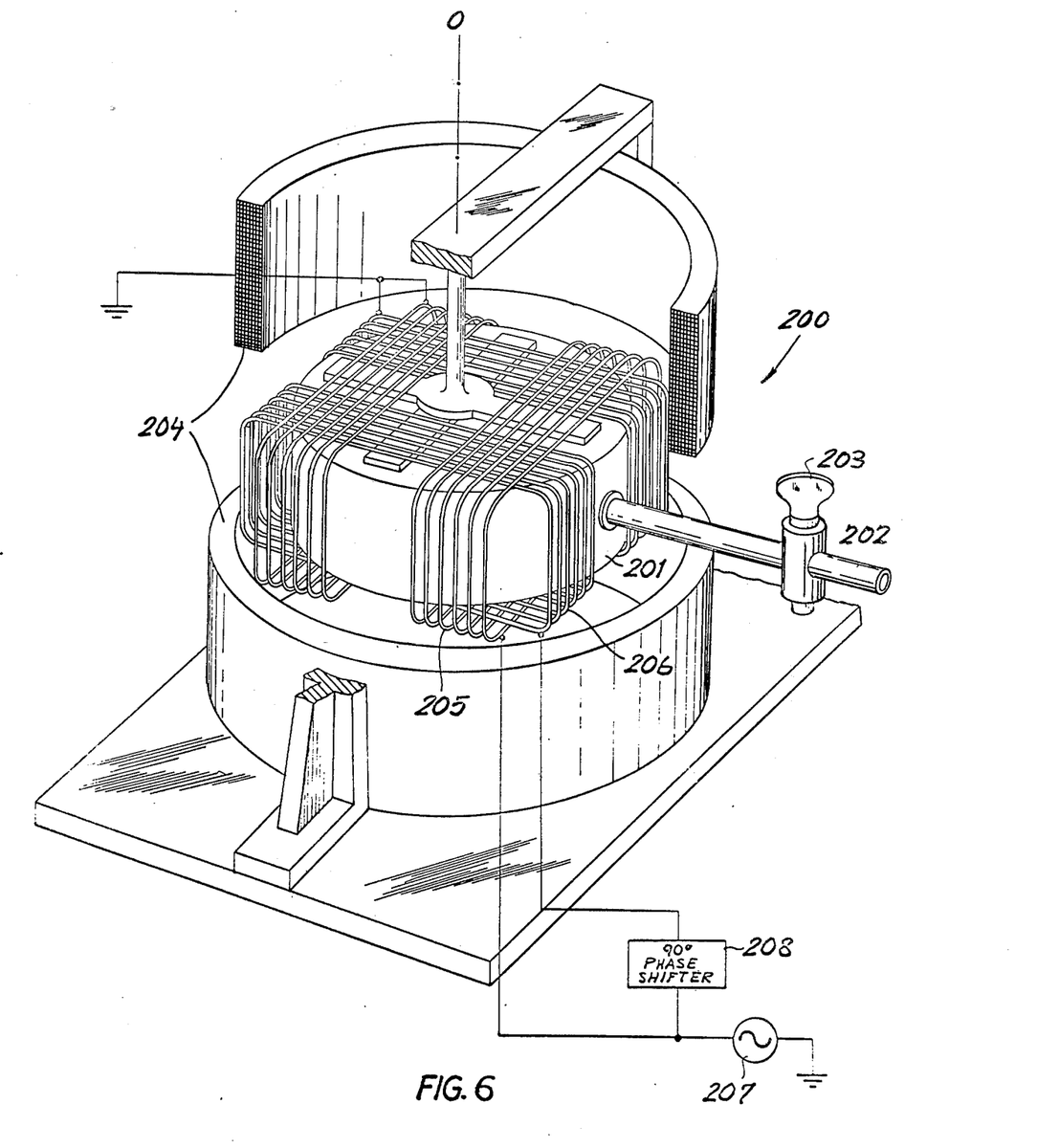
FIG. 6 is a perspective view of an electromagnetically driven accelerator according to my invention.

FIG. 6 shows the overall organization of a particle accelerator 200 of this nature. The accelerator comprises a generally cylindrical vessel 201 of quartz or other refractory material, again centered on an axis O, into whose evacuated interior a low-pressure gas may be admitted through a tube 202 provided with a stopcock 203. A pair of electromagnetic coils 204, connected in parallel or in series across a nonillustrated source of direct current, generate a magnetostatic focusing field which permeates the entire vessel in axial direction. The vessel is also permeated by a radial field which rotates at constant speed about axis O and is produced by a pair of mutually orthogonal coils 205, 206 that are connected in parallel across a high-frequency oscillator 207, a 90° phase shifter 208 being inserted in series with coil 206. The rotation of the magnetic vector causes further ionization of the gas, even if the same originally contained only a small proportion of charged particles, and thereupon entrains the charge in its direction of rotation. The axial focusing field generated by coils 204 should be of sufficient amplitude to limit the orbital radius of the particles to less than the inner radius of the vessel so as to prevent collisions between its wall and the particles.

As discussed above, each entrained particle circles a radial line representing the instantaneous position of the magnetic vector, thus following a quasi-cycloidal path centered on the axis O. The intensity of the rotating field should be sufficient to prevent the particles from straying too far from the radial midplane of the vessel 201 and the coils 205, 206. Thus, the revolving charge is virtually confined to a volume somewhat smaller than the interior of the vessel.

Upon attaining the desired speed, the particles or some of them may be gated out of the vessel 201 via a tangential discharge conduit, not shown in FIG. 6, as more fully described hereinafter with reference to FIGS. 13 – 16.

Figure 7:
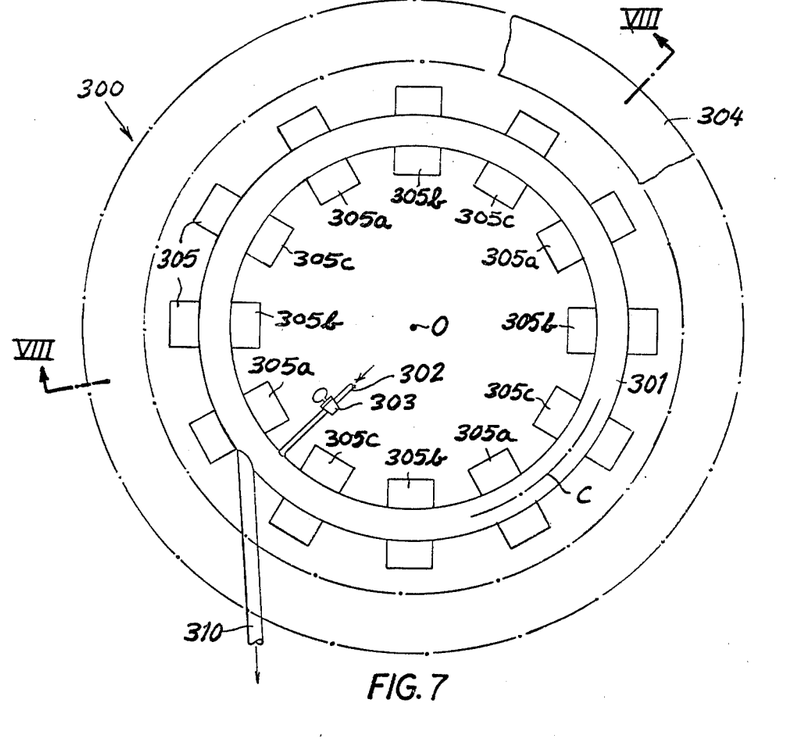
FIG. 7 is a diagrammatic plan view of a modified electromagnetic accelerator.
Figure 8:
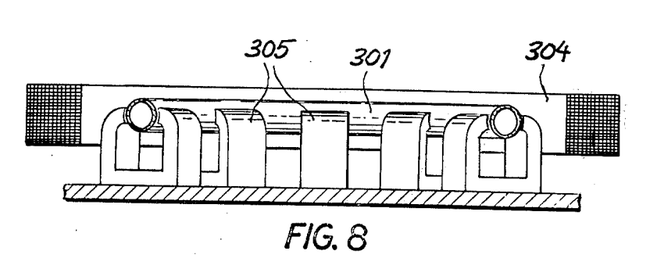
FIG. 8 is a cross-sectional view taken on the line VIII — VIII of FIG. 7.
Figure 9:
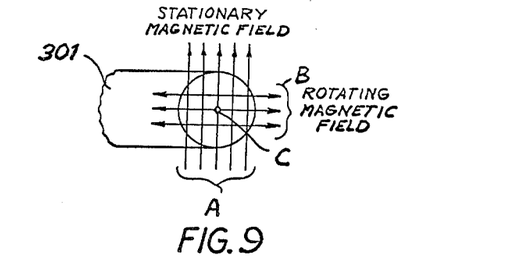
FIG. 9 is a diagram showing the relative position of the driving and focusing fields in the vessel of FIGS. 7 and 8.

FIGS. 7 and 8 show the principal components of a modified particle accelerator 300 of the type illustrated in FIG. 6. The accelerator 300 comprises a toroidal vessel 301 with a centerline C, this vessel having an inlet 302 for a gaseous charge (e.g. a reactant entering into the formation of a compound) and an outlet 310 for same; inlet 302 is provided with a stopcock 303. A coil 304 centered on the vessel axis O, or a stack of such coils as in FIG. 6, generates an axial magnetostatic field whose direction relative to the vessel 301 has been indicated by vertical arrows A in FIG. 9.

A multiplicity of electromagnets 305 are angularly equispaced about the vessel 301 and are divided into four groups of three magnets each, respectively designated 305a, 305b and 305c. Magnets 305a are all energized in parallel (or in series) from a high-frequency oscillator 307 (FIG. 10) which also works into magnets 305b and 305c with interposition of a 120° phase shifter and a 240° phase shifter, respectively; thus, each of these electromagnets generates a sinusoidally varying magnetic field of fixed frequency, with the fields of adjacent magnets 120° (electrical) out of phase. The result is a radially oriented magnetic vector rotating about axis O in a given direction (here clockwise) at a rate of $f/n$ revolutions per second where $f$ is the oscillator frequency and n is the number of magnet groupings (here four). This rotating magnetic field, represented by horizontal arrows B in FIG. 9, interacts with the particles in the manner described above.

Figure 10:
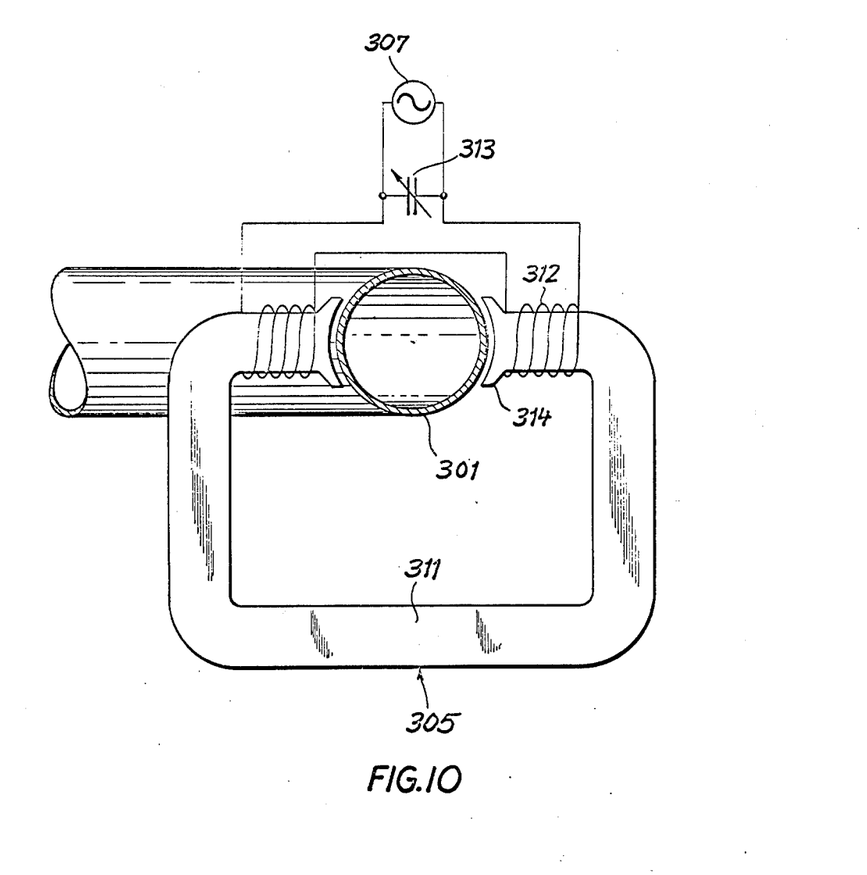
FIG. 10 is an enlarged view of one of the driving magnets shown in FIG. 8.

As more clearly illustrated in FIG. 10, each magnet 305 comprises a core 311 (preferably of ferrite) partly enveloped by a split coil 312 which is connected across oscillator 307 in parallel with a tuning capacitor 313, adjusted to let the network 312, 313 resonate at the oscillator frequency $f$. The two ends of core 311 confronting the vessel 301 terminate in pole shoes 314. A similar core 315, FIG. 11, interlinks a pair of aiding permanent bar magnets 316 to generate a local component of the steady axial field A; core 315 terminates in pole shoes 317 which converge toward the midplane of vessel 301 on the concave side of its centerline C. This unilateral convergence causes a curving of the focusing field, as indicated at A', which restrains the orbiting particles from impinging upon the wall portion of vessel 301 remote from axis O; the slant imparted by the deformed pole shoes 317 also helps keep these particles away from upper and lower wall portions of the vessel.

Figure 11:
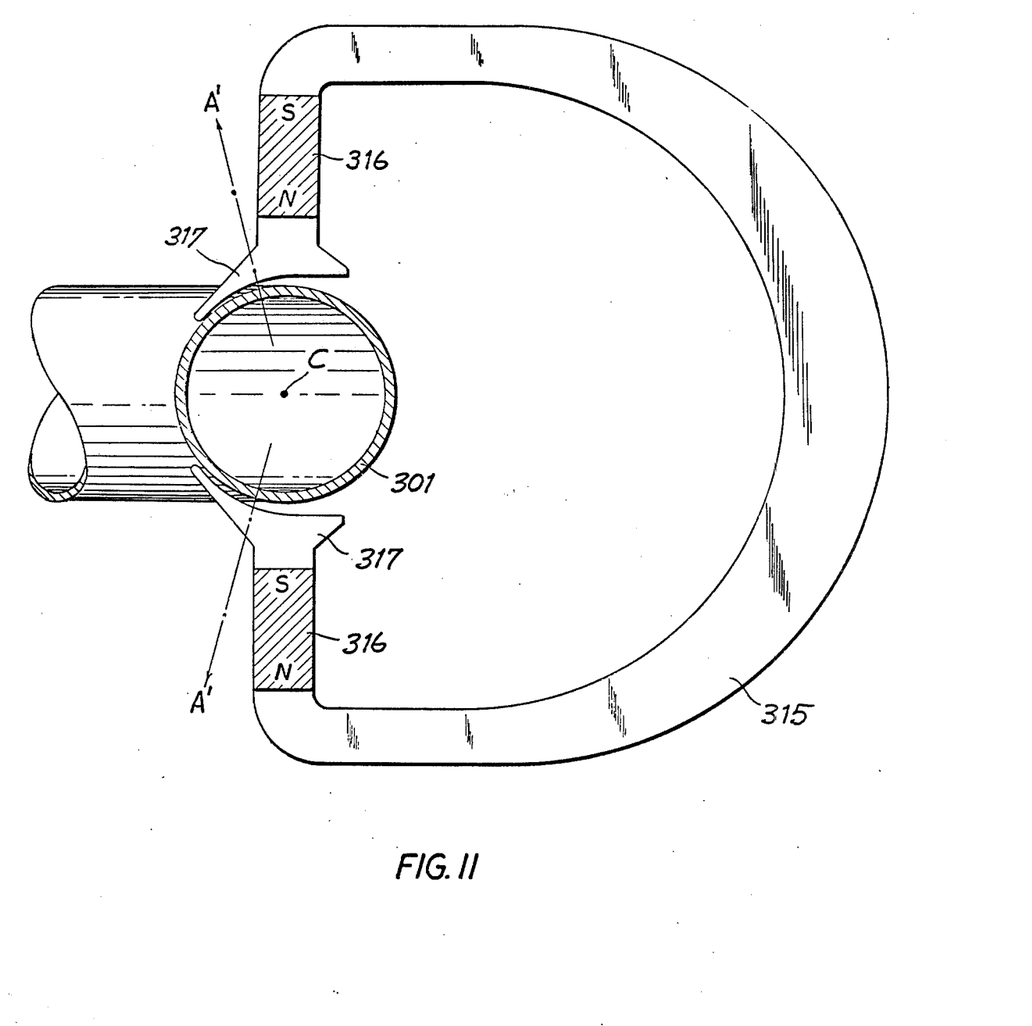
FIG. 11 is a view similar to FIG. 10, showing a focusing magnet for the system of FIGS. 7 - 10.
Figure 12:
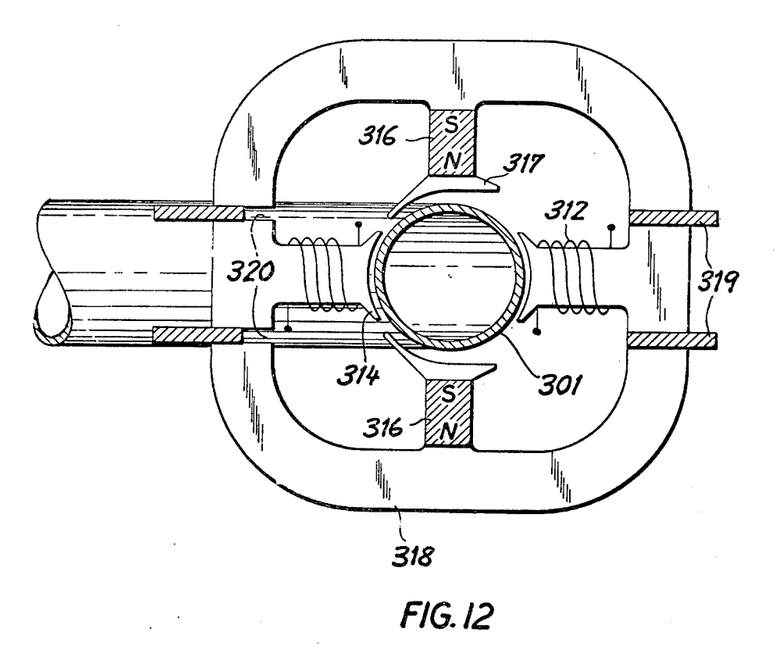
FIG. 12 is a view similar to FIGS. 10 and 11, showing a compound magnet structure.

A multiplicity of magnetic structures 315 – 317, as illustrated in FIG. 11, may be disposed along the toroidal vessel 301 in interleaved relationship with the electromagnets 305. Alternatively, as shown in FIG. 12, the bar magnets 316 and the coil halves 312 may be mounted on a common core structure 318 with horizontally spaced pole shoes 314 and vertically spaced pole shoes 317; the steady flux generated by magnets 316 may be adjusted with the aid of nonmagnetic plates 319 slidably inserted into gaps 320 of core structure 318.

Figure 13:
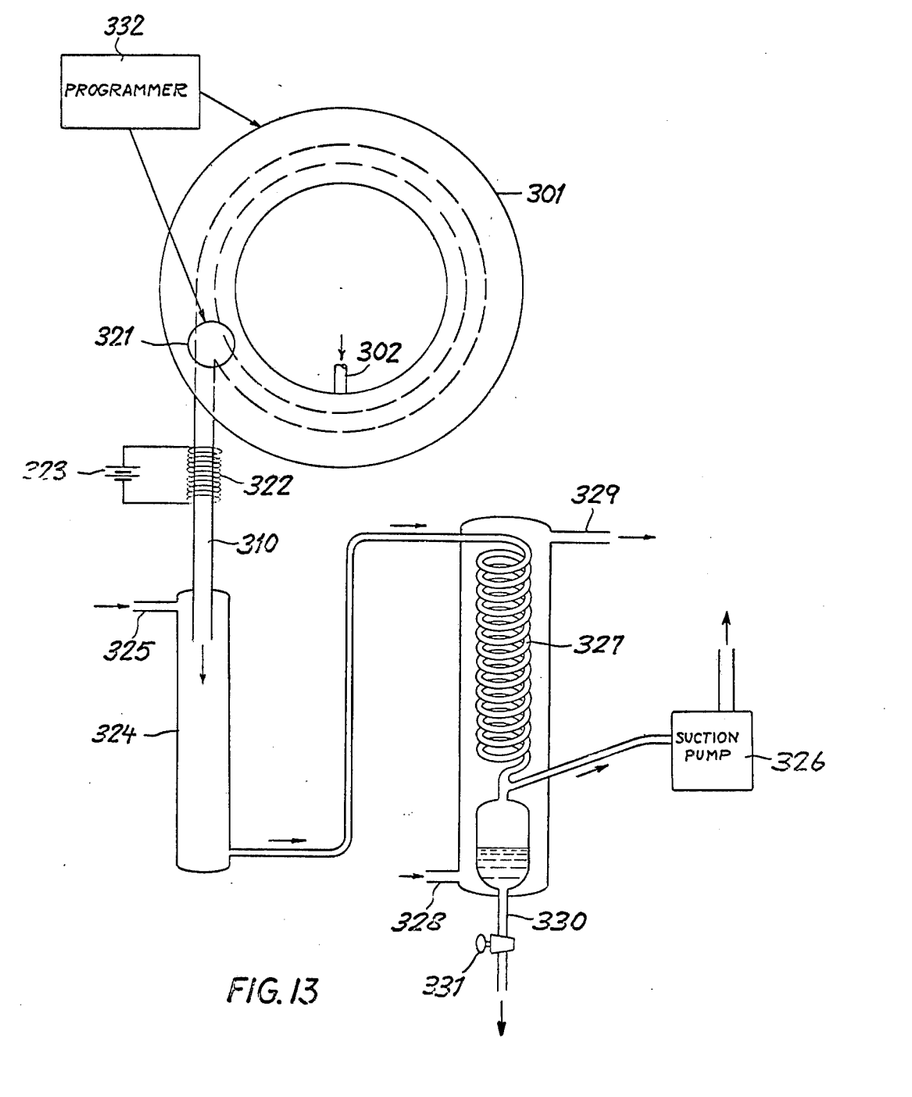
FIGS. 13 - 16 are diagrams illustrating various modes of operation of an accelerator of the type shown in FIGS. 7 - 12.

FIG. 13 illustrates one mode of operating a reactor according to my invention having a toroidal vessel 301 with an inlet 302 and an outlet 310 as described with reference to FIG. 7; in this and subsequent Figures, the drive and focusing magnets have been omitted for the sake of clarity. A gate 321 at the junction of vessel 301 with discharge tube 310 is energizable, in a manner known per se, to create a local magnetic field substantially canceling the focusing field at this point so that the particles continue tangentially into conduit 310 instead of following their annular trajectory along which they had been accelerated to the desired speed. Conduit 310 is enveloped by a focusing coil 322 connected across a d-c source 323.

The high-energy particles exiting from vessel 301 under low pressure are discharged into a reaction chamber 324 also having an inlet 325 for a second reactant to be bombarded by these particles. This second reactant may be a mixture of several cold gases, or may have undergone an acceleration process similar to that described for the first reactant. The two reactant streams may intersect at about 90°, as shown, or at some other angle designed to optimize the desired reaction. The interaction product is drawn by a suction pump 326 into a condenser 327 which is cooled by a cryogenic fluid entering and leaving a surrounding jacket at 328 and 329, respectively. The liquefied final product can be recovered through a drain 330 provided with a stopcock 331.

The energization of the driving magnets and the operation of the discharge gate 321 are advantageously controlled by a programmer 332 which may also intervene in other phases of the process such as the opening and closure of valves for replenishing the reactant content of vessels 301 and 324.

The second reactant, introduced into vessel 324, could also be liquid or even solid rather than gaseous.

Figure 14:
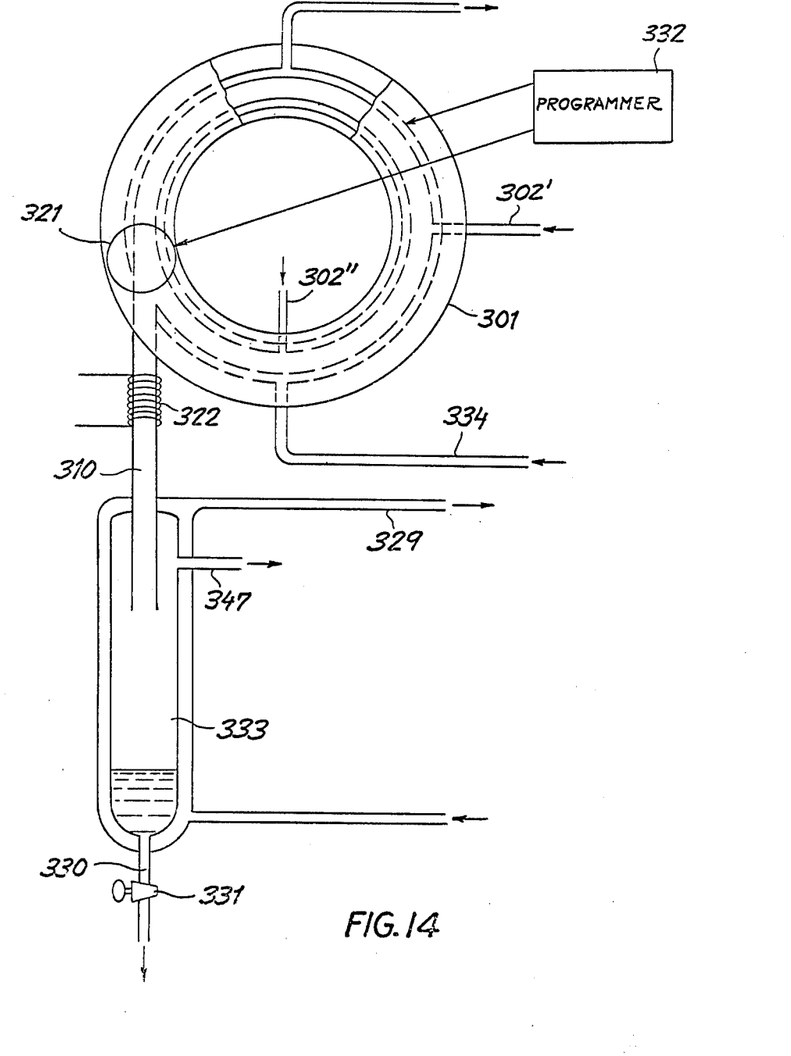

If the pressure of the gas in vessel 301 is relatively high, the pump 326 may be dispensed with; the functions of reaction chamber 324 and condenser 327 could then be combined by a single cooled receptacle 333 as illustrated in FIG. 14. This Figure also shows the vessel 301 equipped with two inlets 302', 302'' for gas streams to be ionized and accelerated therein, with their particles interacting to form a product liquefied and collected in receptacle 333. To dissipate the heat generated by the exothermic reaction in vessel 301, the walls thereof are chilled by a coolant circulating through a conduit 334. In order to intensify this interaction, the programmer 332 advantageously causes a pulsing or other modulation of the driving field generated by the oscillator 307 so as to create local turbulence with numerous collisions between the particles. An exhaust pipe 347 serves for the removal of gaseous byproducts which remain volatile at the condensation temperature of the liquefied reaction product.

The apparatus shown in FIG. 13 or 14 may be used to synthesize various compounds, such as, for example, nitrogen oxides (NO, $NO_2$) or ammonia ($NH_3$), from the corresponding elements. Molecular conversions, e.g. of oxygen ($O_2$) into ozone ($O_3$) or of methane ($CH_4$) or ethane ($C_2H_6$) into acetylene ($C_2H_2$) plus hydrogen, are also possible.

Nuclear interactions including generation of neutrons and nuclear-fusion power may be achieved by accelerating a plasma of hydrogen isotopes in an accelerator of this character to kinetic energies of more than 10,000 electron-volts.

Figure 15:
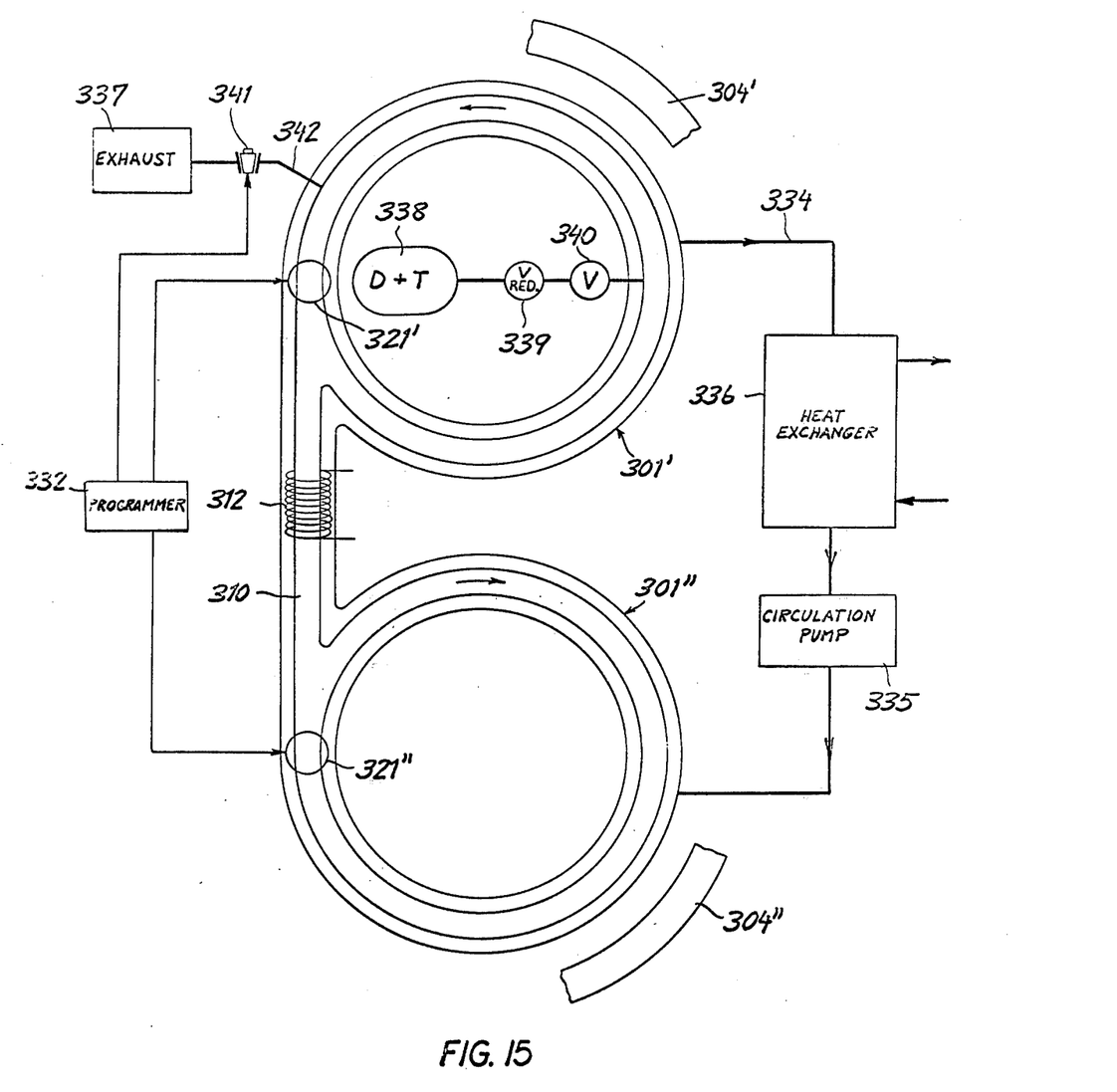

In FIG. 15 I have illustrated two similar vessels 301', 301'' interconnected by a tangential conduit 310 which facilitates the transfer of high-speed plasma from vessel 301' to vessel 301'' by way of an exit gate 321' on the former and on entrance gate 321'' on the latter. The two vessels also share a common cooling circuit 334 including a circulating pump 335 and a heat exchanger 336 enabling the transfer of thermal energy from the reactor to a load. Vessels 301' and 301'' can be exhausted by way of a vacuum pump 337 provided with a programmer-controlled stopcock 341 in a conduit 342. A storage tank 338 contains a fuel gas, such as a mixture of deuterium and tritium, which can be admitted into vessel 301' by way of a reduction valve 339 and a shut-off valve 340. The vessels are shown provided with concentric focusing coils 304', 304'' supplementing or replacing the nonillustrated permanent magnets (FIGS. 11, 12).

In operation, the opening of gates 321' and 321'' under the control of programmer 332 causes a plasma stream of deuterium and tritium, orbiting at high speed in vessel 301', to leave that vessel and enter the vessel 301'' into which a similar plasma stream was previously introduced, prior to energization of the drive magnets. The two charges in vessels 301' and 301'' rotate in opposite directions, i.e. clockwise and counterclockwise in this specific instance, so that the oncoming particles passing the gate 321'' impinge with a high velocity upon the counterrotating particles within vessel 301''. With the energy level in excess of 20,000 electron-volts, fusion of the colliding particles releases neutrons and a large quantity of heat to be carried off by the coolant in circuit 334.

Figure 16:
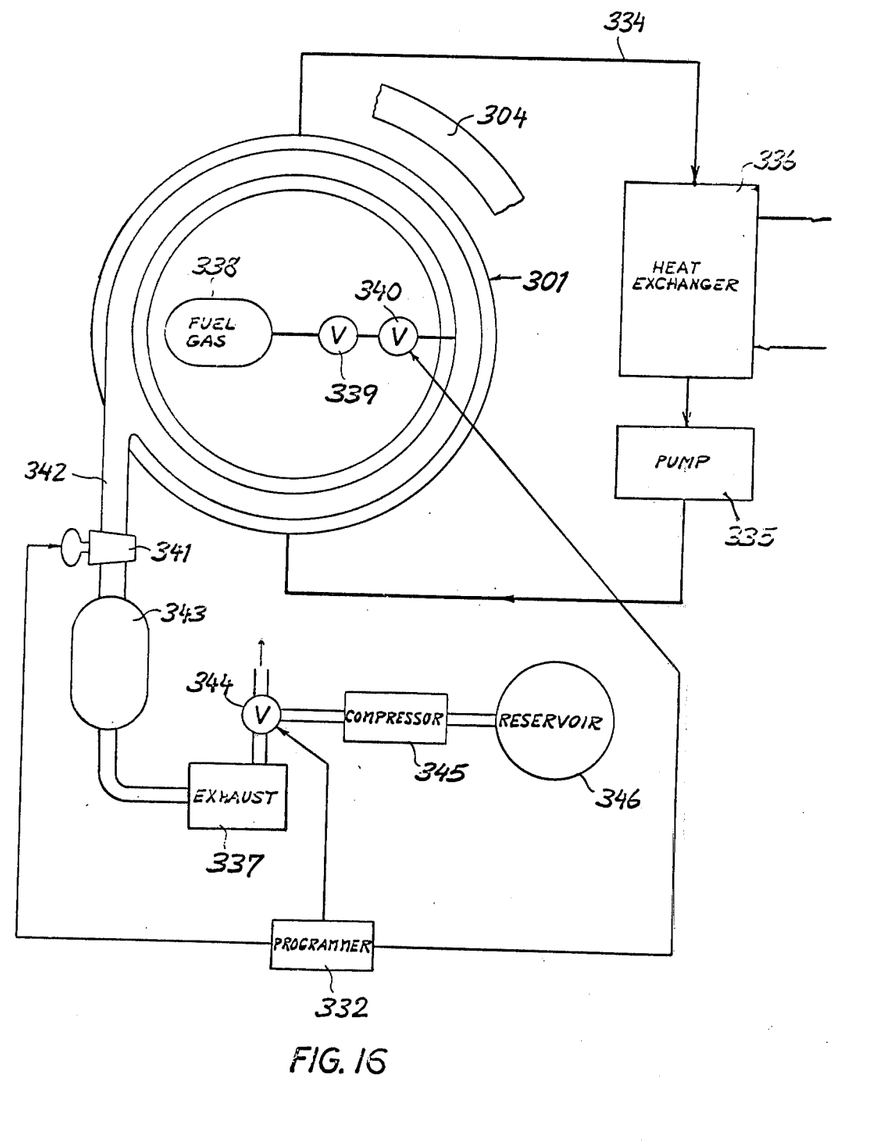

FIG. 16 represents a modified reactor which is similar to that of FIG. 15 but comprises only one vessel 301. A fuel gas, such as the aforedescribed deuterium/tritium mixture, is admitted into this vessel from storage tank 338 by way of valves 339, 340 and is accelerated to an average kinetic energy of 45,000 electron-volts. Initial evacuation of the vessel is carried out, as before, by an exhaust pump 337 connected to a suction line 342 with stopcock 341 controlled by programmer 332, the suction line also including a vacuum flask 343.

Programmer 332 intermittently operates the valve 340 to inject small quantities of fuel gas into the reaction chamber constituted by vessel 301. The resulting fusion again generates neutrons and heat to be utilized in a load to which it is transferred by heat exchanger 336. Excess fuel gas exhausted by pump 337 may be delivered through a programmer-controlled valve 344 and a compressor 345 to a reservoir 346 for subsequent re-use.

If necessary, the electromagnetic drive coils in the system may be shielded to prevent the high-frequency electric field thereof from interacting with the particles inside the vessel.

I claim:

1. An accelerator for charged particles, comprising: a vessel centered on an axis;
magnetostatic means producing a constant magnetic field in substantially axial direction;
excitation means for generating a rotating magnetic field in said vessel with a vector substantially perpendicular to said axis, said field revolving at constant speed about said axis; and
inlet means for admitting charged particles into said vessel for rotary entrainment along an annular path of predetermined radius by the combined action of both magnetic fields.

2. An accelerator as defined in claim 1 wherein said excitation means comprises a plurality of angularly offset electromagnets energized by alternating currents of equal frequency and staggered phase related to their angular orientation.

3. An accelerator as defined in claim 2 wherein said vessel is of toroidal configuration and said electromagnets are spaced along the circular centerline of said toroidal vessel, and in which said magneto static means comprises a plurality of steady-flux magnets spaced along said centerline.

4. An accelerator as defined in claim 3 wherein said steady-flux magnets are interleaved with said electromagnets.

5. An accelerator as defined in claim 3 wherein said steady-flux magnets are disposed in common axial planes with said electromagnets, the coplanar permanent magnets and electromagnets being provided with common core structures.

6. An accelerator as defined in claim 3 wherein said steady-flux magnets are provided with pole shoes converging on the concave side of said centerline for limiting the axial dispersion of said particles.

7. An acclerator for charged particles, comprising: a vessel centered on an axis;
excitation means for generating a rotating magnetic field in said vessel with a vector substantially perpendicular to said axis, said field revolving at constant speed about said axis;
said excitation means comprises a laser drive maintaining a laser beam reflected at the peripheral wall of said vessel along intersecting chords tangent to a circle concentric with said wall, the intersections of said chords defining a polygon generally paralleling said annular path, inlet means for admitting charged particles into said vessel for rotary entrainment by said field along an annular path.

8. An accelerator as defined in claim 7 wherein said vessel is provided with a set of peripherally spaced outer baffles along said wall and with a set of peripherally spaced inner baffles along a circle between said wall and said intersections for suppressing parasitic beam modes.

9. A method of producing a high-energy plasma capable of interacting with other substances, comprising the steps of:
introducing charged particles into a closed vessel centered on an axis,
and the step of providing a stationary magnetic field with a flux vector parallel to the axis,
and the step of generating a magnetic field with a flux vector perpendicular to and rotating about said axis, thereby entraining the plasma particles along an annular path of predetermined radius around said axis.

10. A method as defined in claim 9 wherein the angular velocity and flux intensity of the combined stationary and rotating magnetic fields imparts to said plasma ions kinetic energies exceeding 10,000 electron-volts.

11. A laser excited accelerator for charged particles, comprising:
a vessel forming an annular cavity transparent to laser radiation;
a concentric source of laser radiation contained by said vessel;
a cylindrical reflector cavity for the laser radiation enclosing said laser radiation source in coaxial alignment;
a set of peripherally spaced radial non-reflecting baffles serving to concentrate the laser radiation within said cylindrical reflector cavity into a single mode of very high power concentration projected into said vessel thereby generating a powerful rotating magnetic and electric field along a common axis.

12. A laser excited accelerator according to claim 11 wherein an outer set of peripherally spaced non-reflecting baffles are provided in the space between said laser radiation source and said cylindrical laser reflector cavity thereby enhancing the suppression of undesired laser cavity modes in favor of the desired modes.

* * * * *